US010415548B2

(12) United States Patent
Caponetti et al.

(10) Patent No.: US 10,415,548 B2
(45) Date of Patent: Sep. 17, 2019

(54) ACTIVE PROMOTION OF WIND TURBINE TOWER OSCILLATIONS

(71) Applicant: VESTAS WIND SYSTEMS A/S, Aarhus N (DK)

(72) Inventors: Fabio Caponetti, Aarhus C (DK); Ian Couchman, Horley (GB); Jacob Deleuran Grunnet, Aarhus C (DK); Ilias Konstantinos Ariston, Aarhus C (DK); Poul Brandt Christensen, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 307 days.

(21) Appl. No.: 15/325,056

(22) PCT Filed: Jun. 5, 2015

(86) PCT No.: PCT/DK2015/050146
§ 371 (c)(1),
(2) Date: Jan. 9, 2017

(87) PCT Pub. No.: WO2016/004950
PCT Pub. Date: Jan. 14, 2016

(65) Prior Publication Data
US 2017/0184077 A1    Jun. 29, 2017

(30) Foreign Application Priority Data
Jul. 9, 2014   (DK) .................................. 2014 70429

(51) Int. Cl.
*F03D 17/00* (2016.01)
*F03D 7/02* (2006.01)
(Continued)

(52) U.S. Cl.
CPC .......... *F03D 17/00* (2016.05); *F03D 7/0224* (2013.01); *F03D 7/0296* (2013.01); *F03D 9/25* (2016.05);
(Continued)

(58) Field of Classification Search
CPC . F03D 17/00; F03D 9/25; F03D 13/20; F03D 7/0224; F03D 7/0296; F03D 7/043;
(Continued)

(56) References Cited

U.S. PATENT DOCUMENTS 7,400,055 B2    7/2008  Nagao
2003/0151260 A1  8/2003  Siegfriedsen
(Continued)

FOREIGN PATENT DOCUMENTS

CN    101012808 A    8/2007
CN    102486158 A    6/2012
(Continued)

OTHER PUBLICATIONS

International Search Report for PCT/DK2015/050146, dated Sep. 17, 2015.
(Continued)

*Primary Examiner* — Kenneth J Hansen
*Assistant Examiner* — Benjamin Doyle
(74) *Attorney, Agent, or Firm* — Patterson + Sheridan, LLP

(57) ABSTRACT

The invention relates to a method for determining dynamic parameters associated with damping properties of a wind turbine. The method involves active excitation of tower oscillations by adjusting the pitch or rotor torque. After the active excitation, the parameters can be determined from the passive decay of the excited oscillations. Alternatively, the oscillations can be actively damped, so that the parameters can be determined from the active decay of the excited (Continued)

oscillations. The method for promoting oscillations may be triggered in response to different events or in response to predetermined times for determining the actual dynamic parameters.

14 Claims, 3 Drawing Sheets

(51) Int. Cl.
    *F03D 9/25*      (2016.01)
    *F03D 13/20*     (2016.01)
(52) U.S. Cl.
    CPC ........ *F03D 13/20* (2016.05); *F05B 2220/706* (2013.01); *F05B 2240/2211* (2013.01); *F05B 2240/912* (2013.01); *F05B 2260/83* (2013.01); *F05B 2260/96* (2013.01); *F05B 2260/964* (2013.01); *F05B 2270/32* (2013.01); *F05B 2270/328* (2013.01); *F05B 2270/335* (2013.01); *F05B 2270/404* (2013.01); *Y02E 10/723* (2013.01); *Y02E 10/725* (2013.01); *Y02E 10/728* (2013.01)
(58) Field of Classification Search
    CPC ............... F03D 3/002; F05B 2220/706; F05B 2240/2211; F05B 2240/912; F05B 2260/83; F05B 2260/96; F05B 2260/964; F05B 2270/32; F05B 2270/328; F05B 2270/335; F05B 2270/404; F05B 2270/334; F05B 2260/962; F05B 2260/966; F05B 2270/333; Y02E 10/723; Y02E 10/725; Y02E 10/728
    USPC ............................ 415/4.1, 4.3; 290/44, 55
    See application file for complete search history.

(56) References Cited

U.S. PATENT DOCUMENTS

| | | |
|---|---|---|
| 2007/0110578 A1 | 5/2007 | Stommel |
| 2007/0176428 A1 | 8/2007 | Nagao |
| 2011/0047300 A1* | 2/2011 | Soennichsen ...... G05B 19/0428 710/16 |
| 2012/0139740 A1* | 6/2012 | Drossel ................. F03D 17/00 340/658 |

FOREIGN PATENT DOCUMENTS

| | | |
|---|---|---|
| DE | 102010053523 A1 | 6/2012 |
| EP | 1643122 A2 | 4/2006 |
| EP | 2063110 A1 | 5/2009 |
| GB | 2117933 A | 10/1983 |
| WO | 2007/089136 A2 | 8/2007 |

OTHER PUBLICATIONS

Danish Search Report for PA 2014 70429, dated Feb. 6, 2015.
Chinese Office Action for Application No. 201580043583.9 dated Jun. 29, 2018.

* cited by examiner

ACTIVE PROMOTION OF WIND TURBINE TOWER OSCILLATIONS

FIELD OF THE INVENTION

The invention relates to determination of structural parameters of a wind turbine, particularly to determination of parameters associated with damping properties of a wind turbine.

BACKGROUND OF THE INVENTION

Dynamic properties of wind turbines such as resonance frequencies and damping coefficients are dependent on the wind turbines operating conditions such as wind speed, foundation properties, soil properties and other conditions.

Fatigue of wind turbine parts and, therefore, lifetime of the wind turbine may depend on such dynamic properties.

It may be important for the owner of a wind turbine to be able to determine changes in the expected lifetime of a wind turbine due to changes in dynamic properties, e.g. in order to calculate the expected profit of the wind turbine investment.

Accordingly, there is a need for determining dynamic properties and changes in dynamic properties of wind turbines.

EP2103915A1 discloses an apparatus for determining a resonant frequency of a wind turbine tower, comprising a processing unit configured to receive an acceleration measurement value, said acceleration measurement value being representative of the acceleration of the wind turbine tower in the direction parallel to a rotor rotational axis of the wind turbine and/or in the direction perpendicular to both the rotor rotational axis and the tower axis of the wind turbine. The processing unit comprises a Fourier transform module configured to calculate a spectral vector and a resonant frequency calculation module configured to calculate the tower resonant frequency based on the calculated spectral vector.

The inventors of the present invention have appreciated that improved method for determining dynamic properties of wind turbines would be of benefit, and have in consequence devised the present invention.

SUMMARY OF THE INVENTION

It is an object of the invention to provide a method for the determination of structural parameters of a wind turbine, particularly to determination of parameters associated with damping properties of a wind turbine.

In a first aspect of the invention there is provided a method for operating a wind turbine, the wind turbine comprising a tower and a rotor with at least one rotor blade, the rotor being connected to the tower and being adapted to drive a generator, wherein a pitch angle of each rotor blade is adjustable, the method comprises actively promote tower oscillations of the tower up to a predefined oscillation threshold, and when the predefined oscillation threshold is reached the active promotion of the tower oscillations is stopped;

determine at least one physical parameter relating to the tower oscillation.

Advantageously, by actively promoting oscillations it may be possible to determine the physical parameters on demand. Furthermore, by actively promoting oscillations it may be possible to determine the physical properties in response to a decay of the oscillations.

In an embodiment the wind turbine is operated to actively damp the tower oscillations, wherein the at least one physical parameter is determined on the basis of a decay of the oscillations caused by the active damping of the oscillations.

It may be an advantage to determine the physical parameters on the basis of active damping in order to characterise the wind turbine's physical parameters in active damping situations.

In an embodiment the at least one physical parameter is determined on the basis of a decay of the oscillations caused by passive damping of the oscillations.

Passive damping may be caused by the natural damping of the wind turbine structure itself, but may also include passive dampers such as a damping pendulum or a tuned mass damper, also known as a harmonic absorber.

It may be an advantage to determine physical parameters on the basis of passive damping as an alternative, or additionally to determine the parameters on the basis of active damping in order to characterise the wind turbine's physical parameters in different damping situations. For example, in a situation wherein the wind turbine is disconnected from the grid, e.g. due to a damage, it may be important to be able to determine the physical parameters, e.g. passive damping parameters, in order to estimate changes in the lifetime of the wind turbine. This may be particularly important for off-shore wind turbines since it may take a long time before a repair is conducted, e.g. due to unfavourable sea and wind conditions. Since only passive damping may be available for off-shore wind turbine disconnected from grid due to a failure, it may be important to know the passive damping parameters in order the determine how the lifetime of the wind turbine is affected until the repair can be conducted.

In an embodiment the tower oscillations are promoted by adjusting the pitch angle of a rotor blade to impose an oscillating force onto the tower. In another embodiment the tower oscillations are promoted by adjusting a torque of the rotor to impose an oscillating force onto the tower. Advantageously, the promotion of oscillations may be performed during normal operation of the wind turbine by introducing adjustments in the pitch and/or the rotor torque. The adjustments may be introduced by super imposing a pitch signal and/or rotor torque signal onto the normal operating signals.

Adjusting the pitch angle of a rotor blade to impose an oscillating force onto the tower may involve adjusting one out of a plurality of rotor blades, adjusting two or more or the plurality of rotor blades, or adjusting all rotor blades.

In an embodiment the tower oscillations are promoted by adjusting the pitch angle when a parameter relating to wind speed is above an operating point, and wherein the tower oscillations are promoted by adjusting the torque of the rotor when the parameter relating to wind speed is below the operating point.

Advantageously, the oscillations may be promoted most efficiently by pitch adjustments at relative high wind speeds and most efficiently by rotor torque adjustments at relative low wind speeds. The operating point may be defined as the rated wind speed.

In an embodiment the active damping of the tower oscillations is obtained by adjusting the pitch angle of a rotor blade to impose an oscillating force onto the tower that opposes the oscillation. In another embodiment the active damping of the tower oscillations is obtained by adjusting a torque of the rotor to impose an oscillating force onto the tower that opposes the oscillation.

In an embodiment the steps of actively promoting tower oscillations and determining the at least one physical parameter relating to the tower oscillations are performed at predetermined times. Advantageously, by determining the physical parameters at predetermined times it may be achieved that the parameters are updated regularly.

In an embodiment the steps of actively promoting tower oscillations and determining the at least one physical parameter relating to the tower oscillations are performed in response to an occurrence of an event. Event based determination of the physical parameters may be an advantage for obtaining the physical parameters dependent on different events.

In an embodiment the event is defined to occur when one or more operating parameters associated with operation of the wind turbine meet a predefined operating condition, and wherein the occurrence of the event is dependent on the number of times that the at least one physical parameter has been determined previously for the operating condition, and/or dependent on when the at least one physical parameter was determined for the operating condition most recently.

Advantageously, by determining the physical parameters dependent on predefined operating conditions, it may be possible to determine a map of physical parameters dependent on such different operating conditions.

Furthermore, as an optional condition for the occurrence of an event, the number of times that a physical parameter has been determined, and/or the time since a physical parameter was determined for the operating condition most recently, may be utilised in order to avoid that a physical parameter is determined too frequent and to ensure that physical parameters can be determined for events occurring rarely.

In an embodiment the at least one physical parameter relating to the tower oscillation is determined by a method which does not involve actively promoting tower oscillations, wherein the event is defined to occur when the at least one determined physical parameter, determined by a method which does not involve actively promoting tower oscillations, meets a predefined condition.

Advantageously, this method enables continuous monitoring of estimates of one or more physical parameters and in case one or more physical parameters are outside a predetermined range, then a more accurate determination of the physical parameters may be performed by actively promoting oscillations.

In general the occurrence of an event (defined according to the estimated parameters, operating conditions or other conditions) may further by conditioned by the number of times that the at least one physical parameter has been determined previously for the event (e.g. an estimated parameter lying outside a predetermined range), and/or dependent on when the at least one physical parameter was determined for the event most recently.

In an embodiment a parameter of a control or filter circuit of the wind turbine is updated according to the at least one physical parameter.

The invention also relates to a computer program product comprising software code adapted to control a wind turbine when executed on a data processing system to carry out the steps in accordance with any of the various aspects of the present invention.

A second aspect of the invention relates to a wind turbine control system for operating a wind turbine, the wind turbine comprising a tower and a rotor with at least one rotor blade, the rotor being connected to the tower and being adapted to drive a generator, wherein a pitch angle of each rotor blade is adjustable, the control system comprises a controller configured to actively promote tower oscillations of the tower up to a predefined oscillation threshold, and configured to stop the active promotion of the tower oscillations when the predefined oscillation threshold is reached;

a processing unit configured to determine at least one physical parameter relating to the tower oscillation.

A third aspect of the invention relates to a wind turbine comprising a tower and a rotor with at least one rotor blade, the rotor being connected to the tower and being adapted to drive a generator, wherein a pitch angle of each rotor blade is adjustable, and a wind turbine control system according to the second aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
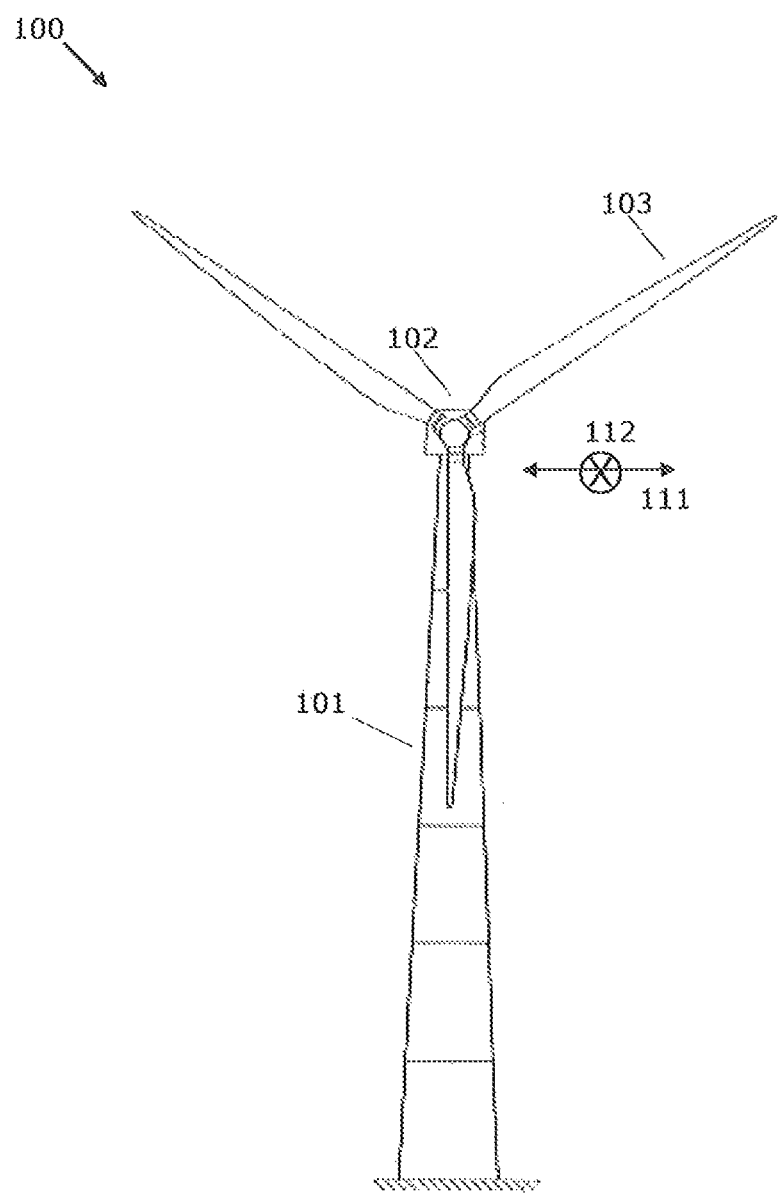
FIG. 1 shows a wind turbine.

FIG. 1 shows a wind turbine 100 comprising a tower 101 and a rotor with at least one rotor blade 103, the rotor being connected to a nacelle 102 which is mounted on top of the tower 101 and being adapted to drive a generator situated inside the nacelle. The rotor assembly of rotor blades 103 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. In this document the wind turbine 100 may also be referred to with the common abbreviation WTG (Wind Turbine Generator).

The pitch or angular position of each of the rotor blades is adjustable around the longitudinal direction of the blades.

The pitch can be adjusted, by means of pitch actuators, to modify the aerodynamic properties of the blades and, thereby, how efficient the kinetic energy of the wind is converted into mechanical energy.

The rotation speed of the rotor can be controlled by controlling the generator's torque load on the shaft.

The tower may be influenced by the wind and other effects to oscillate in sideways directions, i.e. in transverse and/or fore aft directions. Generally, the oscillation may have a component 111 perpendicular to the tower axis and lying in the plane of the rotor (transverse oscillations) and a component 112 perpendicular to the rotor plane (fore aft oscillations).

The tower oscillations, i.e. the sideways oscillations of the tower, can be described (in a simplified way) by the equation $$M\ddot{x} + C\dot{x} + Kx = F$$

wherein x is the displacement variable describing the sideways displacement, $\dot{x}$ is the displacement velocity, $\ddot{x}$ is the displacement acceleration, M is a mass, C is a damping coefficient, K is a stiffness coefficient and F is a force acting on the tower in a sideways direction. F may have components which promote oscillations and components which damp oscillations. The displacement vector x may be a vector containing displacements in two or more directions, e.g. corresponding to the displacement components 111 and 112.

Figure 2:
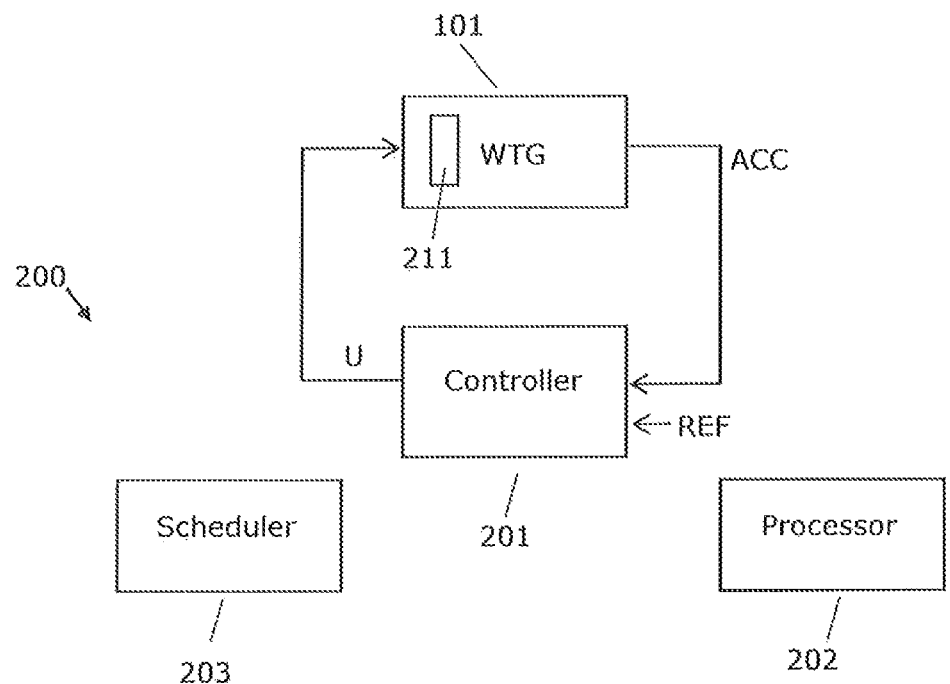
FIG. 2 shows a wind turbine control system configured for controlling a wind turbine.

FIG. 2 shows a wind turbine (WTG) control system 200 configured for controlling a wind turbine 100. The WTG control system 200 may comprise one or more of the units: a controller 201, a processing unit 202 and a scheduling unit 203. The controller 201 has an input for receiving an acceleration signal ACC of the tower, an input for receiving a reference signal REF and an output for supplying a control signal U to the wind turbine. The wind turbine control system 200 may be situated in the wind turbine 100.

The acceleration signal ACC represents a measurement of the displacement acceleration $\ddot{x}$ of the tower oscillations. For example, the acceleration signal ACC may be in the form of an acceleration $\ddot{x}$, a velocity $\dot{x}$, a displacement x or other signal representing the tower oscillations. The displacement acceleration may be measured by an accelerometer located e.g. in the nacelle 102 or in the top of the tower 101. The accelerometer may be configured to measure acceleration in one or more directions, e.g. the directions 111, 112 in FIG. 1.

The controller 201 is configured to generate a control signal U for controlling a controllable device 211 of the wind turbine for the purpose of controlling the tower oscillations, i.e. sideways oscillations of the tower. The controller 201 may be configured as a feedback controller which generates the control signal U for controlling the tower oscillations, by use of the controllable device, so as to minimize the difference between the reference signal REF and the acceleration signal ACC, e.g. the difference between the reference signal REF and an amplitude of the acceleration signal ACC.

The tower oscillations may be controlled by adjusting the pitch angle of one or more of the rotor blades 103 to impose an oscillating force onto the tower. Accordingly, the controllable device 211 may be a pitch control system of a wind turbine which is capable of adjusting the pitch of one or more rotor blades 103. Adjusting the pitch commonly for the blades implies a change in the thrust, i.e. a change in the fore-aft force acting on the blades in the fore-aft direction 112. Adjusting the pitch individually for the blades as a function of the angular position of the blades it is possible to generate forces acting on the blades which sum up to generate a force acting in the transverse direction 111.

Alternatively or additionally, the tower oscillations may be controlled by adjusting a torque of the rotor to impose an oscillating force onto the tower. The torque of the rotor can be adjusted by controlling the generator's torque load on the shaft, e.g. by controlling a power converter connected to power output of the generator to draw more or less power from the generator. Controlling the generator to produce more power slows down the rotor and controlling the generator to produce less power speeds up the rotor. I.e. the rotor torque can be adjusted by adjusting the power reference to the generator or power converter. Accordingly, the controllable device 211 may be embodied by the generator system of the wind turbine controller which is capable of adjusting the torque of the rotor. Adjustment of the rotor torque generates changes in the rotor speed which generates changes in the transverse force acting in the transverse direction 111, i.e. perpendicular to the tower axis and lying in the plane of the rotor.

The tower oscillations may be controlled by other controllable devices 211 installed in the wind turbine and configured for generating oscillating tower forces. For example, oscillations could be controlled by a device configured with two contra-rotating unbalanced masses as described in EP2167748B1, hereby incorporated by reference.

Controlling the tower oscillations may include promotion and/or damping of tower oscillations. The tower oscillations may be promoted and/or damped in a controlled way by means of the controller 201.

The controller 201 may be configured to actively promote tower oscillations of the tower up to a predefined oscillation threshold, and configured to stop the active promotion of the tower oscillations when the predefined oscillation threshold is reached.

Accordingly, the controller 201 may be configured to generate a control signal U to the controllable device 211 for promoting tower oscillations. For example, in order to promote oscillations the controllable device may generate a force F proportional with $-\dot{x}$ and have an amplitude equal to or larger than c. The controller 201 may be configured as a P controller where the control signal U becomes proportional with the time integral of the acceleration signal ACC, i.e. so that $U = K \int \ddot{x} dt$, where K is the gain of the P controller.

The tower oscillations may be promoted by adjusting the pitch angle of a rotor blade to impose an oscillating force onto the tower. Alternatively or additionally, the tower oscillations may be promoted by adjusting a torque of the rotor to impose an oscillating force onto the tower. The adjustment of the pitch angle or torque may be performed by use of the controller 201 or other controller.

Instead of using either pitch control or rotor torque control, the promotion of the tower oscillations may also be obtained by a combination of adjusting the pitch angle of a rotor blade to impose an oscillating force onto the tower and adjusting a torque of the rotor to impose an oscillating force onto the tower. Additionally, other controllable devices 211, such as the device configured with two contra-rotating unbalanced masses, may be combined with pitch control, torque control or both pitch and torque control for promoting oscillations.

Promotion of tower oscillations by use of pitch control is most efficient for relatively high wind speeds, whereas promotions of tower oscillations by use of rotor torque control is most efficient for relatively low wind speeds. Therefore, the WTG control system 200 may be configured to promote tower oscillations by adjusting the pitch angle when a parameter relating to wind speed is above an operating point, and to promote tower oscillations by adjusting the torque of the rotor when the parameter relating to wind speed is below the operating point. During partial load operation, when the wind speed is relatively low, the pitch is fine tuned to match the "power optimal" pitch position, so as to extract as much power as possible from the wind. In full load operation, the power carried by the wind is higher than what the turbine can generate. Hence, to keep the rotational speed and power output regulated, the aerodynamic effectiveness of the blades has to be reduced by pitching the blades out of the wind.

As the blades are pitched out of the wind, the use of pitch adjustments for controlling tower oscillations becomes more effective.

Accordingly, the operating point may correspond approximately to the wind speed level which separates partial and full load operation of the wind turbine, i.e. the rated wind speed.

In general, the operating point may be defined by at least one of a wind speed, a collective reference pitch, a power produced by the generator, rated power, a generated torque and a generator speed.

The processing unit 202 is configured to determine at least one physical parameter relating to the tower oscillation.

The physical parameters relating to tower oscillation generally refer to structural properties of the wind turbine, including foundation properties, which influences the oscillation dynamics, e.g. damping properties and resonance frequencies. For example, a physical property could be a damping coefficient or a resonance frequency.

The physical parameter could be determined on the basis of the acceleration signal ACC, e.g. the measured acceleration signal $\ddot{x}$ or a signal derived thereof such as the tower displacement x of the tower oscillation. For example, the damping coefficient could be determined by analysing a decay of the tower accelerations, i.e. a decay of the acceleration amplitude of the sideways tower displacement acceleration $\ddot{x}$, occurring subsequently to stopping the active promotion of tower oscillations. The resonance frequency could be determined by analysing the spectral content of the tower oscillations.

The processing unit 202 may be an internal processing unit comprised by the wind turbine 100 so that the determination of the at least one physical parameter relating to the tower oscillation is done by instructing a processing unit 202 of the wind turbine 100 to calculate the at least one physical parameter.

Alternatively, the processing unit 202 may be an external processing unit, e.g. a processing unit of a wind turbine plant configured to receive data from a plurality of wind turbines. In this case the determination of the at least one physical parameter relating to the tower oscillation is done by instructing the external processing unit remote from the wind turbine 100 to calculate the at least one physical parameter.

In order to generate a decay of the tower accelerations $\ddot{x}$, the wind turbine may be operated to actively damp the tower oscillations, so that the at least one physical parameter can be determined on the basis of a decay of the oscillations caused by the active damping of the oscillations.

The wind turbine may be operated to actively damp the tower oscillations by using the controller 201 to generate a control signal U for the controllable device 211 for damping tower oscillations. For example, in order to damp tower oscillations the controllable device should generate a force F proportional with $\dot{x}$ so that the damping coefficient c is increased.

Accordingly, the same configuration of the controller 201, e.g. the configuration as a P controller U=K∫$\ddot{x}$dt, may be used both for promoting tower accelerations and for damping tower accelerations, where the sign of K is positive in case of promoting tower oscillations and negative in case of active damping tower oscillations.

Accordingly, by use of the controller 201 or other suitable controller the active damping of the tower oscillations may be obtained by adjusting the pitch angle of a rotor blade to impose an oscillating force onto the tower that opposes the oscillation, alternatively or additionally by adjusting a torque of the rotor (by controlling the power generator) to impose an oscillating force onto the tower that opposes the oscillation.

Instead of using either pitch control or rotor torque control, the active damping of the tower oscillations may also be obtained by a combination of adjusting the pitch angle of a rotor blade to impose an oscillating force onto the tower that opposes the oscillation and by adjusting a torque of the rotor to impose an oscillating force onto the tower that opposes the oscillation. Additionally, other controllable devices 211 may be combined with pitch control, torque control or both pitch and torque control for damping oscillations.

The operation of the wind turbine to actively damp tower oscillations may be facilitated by other means than the controller 201 and by other controllable devices 211 than pitch and generator systems, e.g. by the device configured with two contra-rotating unbalanced masses.

Alternatively, the at least one physical parameter may be determined on the basis of a decay of the oscillations caused by passive damping of the oscillations. Accordingly, after the active promotion of the tower oscillations is stopped, the passive damping caused by the wind turbine's natural damping or passive damping caused e.g. by a damping pendulum may be used for generating the decay.

Accordingly, steps for operating the wind turbine 100 may comprise one or more steps of:

actively promoting tower oscillations of the tower, e.g. up to a predefined oscillation threshold, stopping the active promotion of the tower oscillations, e.g. when a predefined oscillation threshold is reached, damping the tower oscillations, by active or passive damping, and determining at least one physical parameter relating to the tower oscillation on the basis of a decay of the oscillations caused by active or passive damping.

Figure 3:
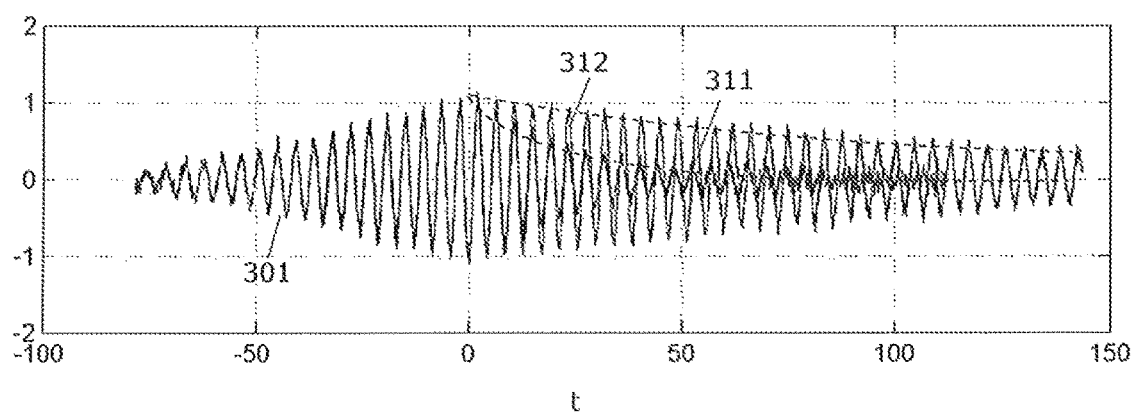
FIG. 3 shows tower oscillations in a measured acceleration signal as a function of time.

FIG. 3 shows tower oscillations in a measured acceleration signal $\ddot{x}$ 301 as a function of time. Initially, up to time t=0, the tower oscillation is promoted up to an amplitude of 1 m/s$^2$. After t=0, the oscillations decay due to either active damping as shown along active decay curve 311 or passive damping as shown along passive decay curve 312. Decay parameters which characterise the active damping capabilities can be determined from the active decay curve 311 and decay parameters which characterise the passive damping capabilities can be determined from the passive decay curve 312. Other physical parameters, such as oscillation frequencies, may be determined from the acceleration signal, e.g. by performing a FFT analysis.

The WTG control system 200 or other unit may be configured to perform the steps of actively promoting tower oscillations and determining the at least one physical parameter relating to the tower oscillations at predetermined times, for example once a week or so, and/or in response to an occurrence of an event.

The physical parameters may change over time. For example, foundation or soil properties of off-shore wind turbines may change over time and, therefore, damping properties may also change over time. Accordingly, it may be important to check e.g. damping parameters at predetermined times or intervals.

Furthermore, the physical parameters, such as damping parameters, may be dependent on operating parameters of the wind turbine and, therefore, it may be important to check the physical parameters dependent on operating parameters, e.g. dependent on an event defined in terms of operating parameters.

An event may be related to an operating parameter associated with operation of the wind turbine. Examples of operating parameters comprises wind speed, wind turbulence intensity, wake/non-wake, wave height in case of off-shore wind turbines, rotor speed set-points, power set-points of the power converter, and rotor icing conditions. For example, an event may be defined to occur when the wind speed corresponds to one or more predefined wind speed values. In general, an event may be defined to occur when one or more operating parameters associated with operation of the wind turbine meet a predefined operating condition, e.g. meet predefined values of the different operating parameters.

Accordingly, the WTG control system 200 or other unit may be configured to determine the physical parameters relating to the tower oscillations in response to an event defined to occur when one or more operating parameters associated with operation of the wind turbine meet a predefined operating condition.

Furthermore, the occurrence of the event may be dependent on the number of times that the at least one physical parameter has been determined previously for the operating condition, and/or dependent on when the at least one physical parameter was determined for the operating condition most recently. This condition may be optional.

For example, if a physical parameter has been determined more than two times within a given period for a given value of an operating parameter, that physical parameter may be considered to be valid so that a test of the physical parameter for that value of the operating parameter is not performed.

The determined physical parameters may be stored in a table or as a function of different operating conditions or events.

The at least one physical parameter relating to the tower oscillation may be determined by other methods which does not involve actively promoting tower oscillations according to embodiments of the invention. For example, the damping coefficient may be determined by analysing an amplitude spectrum obtained e.g. by determining naturally occurring tower oscillation amplitudes from a FFT amplitude spectrum. The analysing may include determining the resonance frequency as the frequency of the peak of the lowest amplitude spectrum, and the damping may be determined from the lowest peak by use of the well known half power method.

The physical parameters determined by the alternative method may be considered as estimates for the physical parameters. If such an estimated physical parameter lies outside a predetermined range, the WTG control system 200 may be activated in order to determine a more accurate physical parameter.

Accordingly, an event may also be defined to occur when the at least one determined physical parameter, determined by a method which does not involve actively promoting tower oscillations, meets a predefined condition.

The at least one physical parameter determined according to an embodiment of the invention may be used for updating a parameter of a control or filter circuit of the wind turbine 100, e.g. notch filter used for filtering out tower oscillations. For example, selective filters may be retuned on the basis of the physical parameter to extract the tower natural frequency for active tower damping.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage. Any reference signs in the claims should not be construed as limiting the scope.

What is claimed is:

1. A method of operating a wind turbine, the wind turbine comprising a tower and a rotor with at least one rotor blade, the rotor being connected to the tower and being adapted to drive a generator, wherein a pitch angle of each rotor blade is adjustable, the method comprising:
    actively promoting tower oscillations of the tower up to a predefined oscillation threshold, wherein actively promoting the tower oscillations is stopped when the predefined oscillation threshold is reached;
    performing damping of the tower oscillations, wherein the damping comprises one of active damping and passive damping; and
    determining, based on a decay of the tower oscillations caused by the damping, at least one physical parameter relating to the tower oscillation.

2. The method of operating a wind turbine according to claim 1, wherein the tower oscillations are promoted by adjusting the pitch angle of a rotor blade to impose an oscillating force onto the tower.

3. The method of operating a wind turbine according to claim 1, wherein the tower oscillations are promoted by adjusting a torque of the rotor to impose an oscillating force onto the tower.

4. The method of operating a wind turbine according to claim 2, wherein tower oscillations are promoted by adjusting the pitch angle when a parameter relating to wind speed is above an operating point, and wherein the tower oscillations are promoted by adjusting a torque of the rotor when the parameter relating to wind speed is below the operating point.

5. The method of operating a wind turbine according to claim 1, wherein the active damping of the tower oscillations is obtained by adjusting the pitch angle of the at least one rotor blade to impose an oscillating force onto the tower that opposes the tower oscillations.

6. The method of operating a wind turbine according to claim 1, wherein the active damping of the tower oscillations is obtained by adjusting a torque of the rotor to impose an oscillating force onto the tower that opposes the oscillation.

7. The method of operating a wind turbine according to claim 1, wherein the steps of actively promoting tower oscillations and determining the at least one physical parameter relating to the tower oscillations are performed at predetermined times.

8. The method of operating a wind turbine according to claim 1, wherein the steps of actively promoting tower oscillations and determining the at least one physical parameter relating to the tower oscillations are performed in response to an occurrence of an event.

9. The method of operating a wind turbine according to claim 8, wherein the event is defined to occur when one or more operating parameters associated with operation of the wind turbine meet a predefined operating condition, and wherein the occurrence of the event is dependent on the number of times that the at least one physical parameter has been determined previously for the operating condition, and/or dependent on when the at least one physical parameter was determined for the operating condition most recently.

10. The method of operating a wind turbine according to claim 8, wherein:
the at least one physical parameter relating to the tower oscillations is determined by a method which does not involve actively promoting tower oscillations; and
the event is defined to occur when the at least one determined physical parameter, determined by a method which does not involve actively promoting tower oscillations, meets a predefined condition.

11. The method of operating a wind turbine according to claim 1 wherein a parameter of a control or filter circuit of the wind turbine is updated according to the at least one physical parameter.

12. A non-transitory computer readable medium adapted to control a wind turbine when executed on a data processing system of the wind turbine, the computer readable medium comprising software code programmed to carry out the method according to claim 1.

13. A wind turbine control system for operating a wind turbine, the wind turbine comprising a tower and a rotor with at least one rotor blade, the rotor being connected to the tower and being adapted to drive a generator, wherein a pitch angle of each rotor blade is adjustable, the control system comprising:
a controller configured to actively promote tower oscillations of the tower up to a predefined oscillation threshold, and configured to stop the active promotion of the tower oscillations when the predefined oscillation threshold is reached;
a controllable device configured to damp the tower oscillations by at least one of: active damping and passive damping; and
a processor configured to determine, on the basis of a decay of the oscillations caused by the damping, at least one physical parameter relating to the tower oscillations.

14. A wind turbine comprising:
a tower and a rotor with at least one rotor blade, the rotor being connected to the tower and being adapted to drive a generator, wherein a pitch angle of each rotor blade is adjustable, and
a wind turbine control system comprising:
a controller configured to actively promote tower oscillations of the tower up to a predefined oscillation threshold, and configured to stop the active promotion of the tower oscillations when the predefined oscillation threshold is reached;
a controllable device configured to damp the tower oscillations by at least one of: active damping and passive damping; and
a processor configured to determine, on the basis of a decay of the tower oscillations caused by the damping, at least one physical parameter relating to the tower oscillations.

* * * * *